(12) United States Patent
Cheng et al.

(10) Patent No.: US 10,952,300 B2
(45) Date of Patent: Mar. 16, 2021

(54) LED DRIVER AND CONTROLLER THEREOF, AND LED LIGHTING DEVICE

(71) Applicant: Chipone Technology (Beijing) Co., Ltd., Beijing (CN)

(72) Inventors: Zhiqiang Cheng, Beijing (CN); Youping Jia, Beijing (CN)

(73) Assignee: CHIPONE TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 16/628,005

(22) PCT Filed: Jun. 10, 2019

(86) PCT No.: PCT/CN2019/090596
§ 371 (c)(1),
(2) Date: Dec. 31, 2019

(87) PCT Pub. No.: WO2020/001262
PCT Pub. Date: Jan. 2, 2020

(65) Prior Publication Data
US 2021/0029800 A1    Jan. 28, 2021

(30) Foreign Application Priority Data

Jun. 27, 2018 (CN) .......................... 201810678909.0

(51) Int. Cl.
*H05B 45/32* (2020.01)
*H05B 45/50* (2020.01)

(52) U.S. Cl.
CPC ............. *H05B 45/50* (2020.01); *H05B 45/32* (2020.01)

(58) Field of Classification Search
None
See application file for complete search history.

(56) References Cited

U.S. PATENT DOCUMENTS 10,128,740 B1 *  11/2018 Xiong .................... H05B 45/40

FOREIGN PATENT DOCUMENTS

| CN | 205810342 U | | 5/2016 |
|---|---|---|---|
| CN | 206136405 U | | 4/2017 |
| CN | 206136406 U | | 4/2017 |
| CN | 106714367 A | | 5/2017 |
| CN | 106786450 | | 5/2017 |
| CN | 108650744 A | | 10/2018 |
| CN | 208300087 U | | 12/2018 |
| CN | 109921624 A | * | 6/2019 |

* cited by examiner

*Primary Examiner* — Dedei K Hammond
(74) *Attorney, Agent, or Firm* — Treasure IP Group, LLC

(57) ABSTRACT

Disclosed an LED driving controller and a driving circuit. The LED driving controller comprises: a power transistor having a control terminal for receiving a switching control signal, a first terminal and a second terminal; zero-crossing detection circuit for generating a zero-crossing detection signal; a first comparison circuit, configured to compare a reference voltage with a sampling voltage to generate a first control signal; a control circuit being coupled to the zero-crossing detection circuit and the comparison circuit and configured to generate a switching control signal in accordance with the zero-crossing detection signal and the first control signal; an overvoltage protection circuit configured to generate an overvoltage protection signal in accordance with an off-time provided by the control circuit and a reference voltage; a shielding circuit configured to shield the overvoltage protection signal is provided.

15 Claims, 7 Drawing Sheets

LED DRIVER AND CONTROLLER THEREOF, AND LED LIGHTING DEVICE

CROSS-REFERENCE TO RELATED APPLICATION

The present application claims the benefit of Chinese Patent Application No. 201810678909.0, filed on Jun. 27, 2018, entitled "LED DRIVING CONTROLLER, LED DRIVING CIRCUIT AND LED LIGHTING DEVICE", which is incorporated herein by reference in its entirety.

BACKGROUND OF THE DISCLOSURE

Field of the Disclosure

The present disclosure relates to the technical field of electronic technology, more particularly, to an LED driving controller, an LED driving circuit, and an LED lighting device.

Background of the Disclosure

A Lighting Emitting Diode (LED) has many advantages such as long service life, small size, low power consumption, low operating temperature and so on, so it is widely used in LED lighting and display products.

The luminance of an LED lamp is related to its driving current, and corresponding driving schemes include a linear driving scheme and a switch driving scheme. In the two schemes, the driving current is adjusted respectively by linearly adjusting a transistor and control a transistor in a switching mode. FIG. 1 is a circuit diagram of a switching LED driving circuit in the prior art. As shown in FIG. 1, the LED driving circuit includes a rectifier and filter circuit 10, a power supply 20, an existing LED driving controller 30, and an output stage circuit 40. The rectifier and filter circuit 10 includes a rectifier bridge 101 and a first capacitor C1, wherein the rectifier bridge 101 rectifies and filters an input AC voltage AC into a DC bus voltage Vin, and stores it in the first capacitor C1. The power supply 20 includes a resistor R and a second capacitor C2. The DC bus voltage Vin charges the second capacitor C2 through a resistor R in order to provide a stable supply voltage VCC to the existing LED driving controller 30. The output stage circuit 40 includes an inductor L, a diode D, and a third capacitor C3. The diode D is coupled between a pin DRAIN of the LED driving controller 30 and the DC bus voltage Vin, the inductor L is coupled between the pin DRAIN of the LED driving controller 30 and an output terminal Vout of the output stage circuit 40, and the third capacitor C3 is coupled between the DC bus voltage Vin and the output terminal Vout. An LED load 50 including a plurality of LEDs coupled in series, is coupled in parallel between the DC bus voltage Vin and the output terminal Vout. The output stage circuit 40 drives the LED load 50 in accordance with the DC current output from the LED driving controller 30.

FIG. 2 is a block diagram showing an internal structure of the LED driving controller in the prior art, and FIG. 3 is an operational waveform diagram of the LED driving controller 30 in the prior art. A pin VCC of the LED driving controller is a power supply pin for receiving the supply voltage VCC, the pin DRAIN is coupled to an internal switching transistor Q, a pin CS is a sampling pin for sampling the current flowing through the switching transistor Q and is coupled to a sampling resistor Rcs, a pin GND is a ground pin, a pin OVP is an open protection pin and is coupled to an open circuit protection resistor Rovp. When the switching transistor Q integrated in the interior of the LED driving controller 30 is turned on, the inductor L stores energy, and the inducting current $I_L$ keeps rising. When the voltage Vcs across the sampling resistor Rcs is greater than a reference voltage Vref, a comparator U1 outputs a first control signal S1 to a control circuit. After receiving the first control signal, the control circuit controls the switching transistor Q to be turned off and the inducting current rises to a predetermined threshold value Ipk. The on-time Ton of the LED driving controller 30 is $T_{on}=L*Ipk/(Vin-V_{LED})$, wherein Ipk=Vref/Rcs, $V_{LED}$ is the voltage across the LED load 50, that is the voltage difference between the voltages Vin and Vout. When the internal switching transistor Q in the LED driving controller 30 is turned off, the inductor L provides energy, and the inducting current $I_L$ cannot instantaneously jump, and thus, the inducting current $I_L$ gradually decreases from the peak value Ipk until it decreases to zero. When the zero-crossing detection circuit detects that the inducting current $I_L$ is zero, a zero-crossing detection signal ZCD is sent to the control circuit, so that the control circuit is reset to turn on the control switch Q, and the off-time Toff of the LED driving controller 30 is $T_{off}=L*Ipk/V_{LED}$. That is, when the inducting current $I_L$ is charged to a predetermined threshold value Ipk, the LED driving controller 30 turns off the switching transistor Q, and when the inducting current $I_L$ decreases to zero, the LED driving controller 30 turns on the switching transistor Q. The signals are provided repeatedly in this way. Therefore, the internal switching transistor Q of the LED driving controller 30 is repeatedly switched between the on and off states to make the LED driving controller 30 operate in a critical conduction mode.

Since there are no auxiliary windings, it is impossible to directly detect the voltage across the LEDs. At present a common method is to detect the off-time Toff and compare it with an internal reference time Tovp. When the off-time Toff is greater than Tovp, the LED driving controller operates normally; when the off-time Toff is less than Tovp, an overvoltage protection signal OVP is sent to the control circuit, and the LED driving controller enters in an overvoltage protection mode for preventing the LEDs from being burned out.

Since the input AC voltage AC is rectified and filtered by the rectifier bridge 101 and the first capacitor C1, the DC bus voltage Vin generates a large ripple, especially when the input voltage is small and the voltage of the LED is large, the minimum value of Vin is close to $V_{LED}$, and at this time, the on-time Ton of the switching transistor Q is large. The frequency of sound audible to an average human ear ranges from 20 Hz to 20 kHz. If nothing is done, the frequency may be heard by the human ear, which is known as an inductance whistling phenomenon. The method for solving the inductance howling phenomenon is to increase a maximum on-time circuit inside the LED driving controller 30. When the maximum on-time Ton_max is reached, the switching transistor Q is turned off even if the inducting current $I_L$ does not reach the predetermined threshold Ipk. However, when the peak value of the inducting current $I_L$ is relatively small, the off-time Toff is also smaller than a normal value, correspondingly, so that the phenomenon of Toff<Tovp is likely to occur, which cause the LEDs flash due to the entry of the overvoltage protection mode.

SUMMARY OF THE DISCLOSURE

In view of this, an object of the present disclosure is to provide an LED driving controller, an LED driving circuit, and an LED lighting device, in which the LED load is prevented from flashing due to the entry of the overvoltage protection mode when the input voltage is relatively small and the voltage across the LED load is relatively large.

According to a first aspect of the present disclosure, there is provided an LED driving controller, comprising:

a power transistor having a control terminal for receiving a switching control signal, a first terminal being coupled to an LED load through an inductor and a second terminal being grounded through a sampling resistor;

a zero-crossing detection circuit having an input terminal being coupled to the first terminal of the power transistor and configured to generate a zero-crossing detection signal;

a first comparison circuit configured to compare a reference voltage with a sampling voltage to generate a first control signal;

a control circuit being coupled to the zero-crossing detection circuit and the first comparison circuit and configured to generate a switching control signal in accordance with the zero-crossing detection signal and the first control signal, wherein the switching control signal is used to turn on and off the power transistor; an overvoltage protection circuit having an input terminal being grounded through an overvoltage protection resistor and configured to generate an overvoltage protection signal in accordance with an off-time provided by the control circuit and a reference voltage;

a shielding circuit being disposed between the overvoltage protection circuit and the control circuit and configured to shield the overvoltage protection signal from being effective in accordance with a shielding signal when the power transistor is turned off and is reset to make the voltage protection signal to be effective when the power transistor is turned on.

Preferably, the control circuit comprises:

a shielding signal generating circuit configured to generate the shielding signal in accordance with the first control signal and a second control signal; and a logic circuit configured to shield the overvoltage protection signal from being effective in accordance with the shielding signal when the power transistor is turned off, and to be reset to make the overvoltage protection signal effective when the power transistor is turned on.

Preferably, the control circuit further comprises:

a second comparison circuit configured to generate the second control signal in accordance with an on-time and a maximum on-time provided by the control circuit.

Preferably, when the first control signal is a high level pulse and the second control signal is kept at a low level, the shielding signal remains at a high level, so that the overvoltage protection signal is effective.

Preferably, when the first control signal is kept at a low level and the second control signal is a high level pulse, the shielding signal is kept at a low level, so that the overvoltage protection signal is ineffective Preferably, the control circuit further comprises:

a maximum on-time circuit configured to generate the maximum on-time.

Preferably, the control circuit further comprises:

a leading edge blanking circuit configured to generate the second control signal in accordance with the switching control signal.

Preferably, when the first control signal and the second control signal are both high level pulses, the shielding signal is at a high level in the time period during which the power transistor is off, and at a low level in the time period during which the power transistor is on, so that the overvoltage protection signal is effective in the time period during which the power transistor is off and ineffective in the time period during the power transistor is on.

Preferably, when the first control signal is kept at a low level and the second control signal is a high level pulse, the shielding signal is kept at a low level, so that the overvoltage protection signal is ineffective.

Preferably, the shielding signal generating circuit comprises a first NOR gate, a second NOR gate, and a NOT gate, the first NOR gate has a first input terminal for receiving the second control signal, a second input terminal being coupled to an output terminal of the second NOR gate, and an output terminal being coupled to a first input terminal of the second NOR gate;

the first input terminal of the second NOR gate is coupled to the output terminal of the first NOR gate, a second input terminal of the second NOR gate f receives the first control signal and the output terminal of the second NOR gate outputs the shield signal.

Preferably, the control circuit comprises a NAND gate.

Preferably, the first comparison comprises:

a reference voltage generating unit configured to generate the reference voltage in accordance with a supply voltage;

a first comparison unit configured to generate the first control signal in accordance with the reference voltage and the sampling voltage.

Preferably, the overvoltage protection circuit comprises:

a reference time unit configured to generate a reference time in accordance with the reference voltage; and a second comparison unit configured to generate the overvoltage protection signal in accordance with the off-time provided by the control circuit and the reference time.

According to another aspect of the disclosure, there is provided an LED driving circuit including the above LED driving controller.

According to a third aspect of the disclosure, there is provided an LED lighting device including the above LED driving circuit and an LED load.

According to the LED driving controller, the LED driving circuit and the LED lighting device provided by the disclosure, the shielding circuit is disposed between the overvoltage protection circuit and the control circuit, the shielding circuit make the overvoltage protection circuit ineffective in accordance with the shielding signal when the power transistor is turned off, so that the LEDs are prevented from flashing due to the entry of the overvoltage protection mode when the input voltage is relative small and the voltage across the LED load is relative large. Further, the shielding circuit is reset when the power transistor is turned on, so that the overvoltage protection circuit operates normally to avoid the phenomenon of LED burning.

BRIEF DESCRIPTION OF THE DRAWINGS

The above and other objects, advantages and features of the present disclosure will become more fully understood from the detailed description given below in connection with the appended drawings, and wherein.

DETAILED DESCRIPTION OF THE DISCLOSURE

Figure 1:
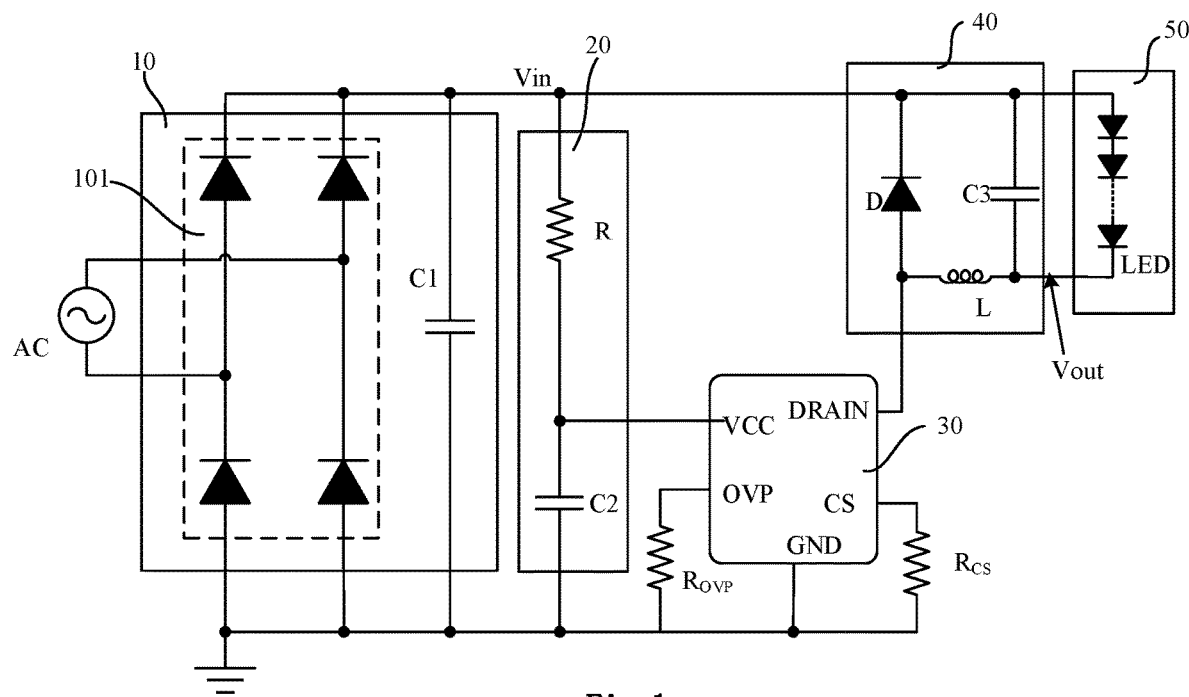
FIG. 1 is a circuit diagram of a switching LED driving circuit in the prior art.
Figure 2:
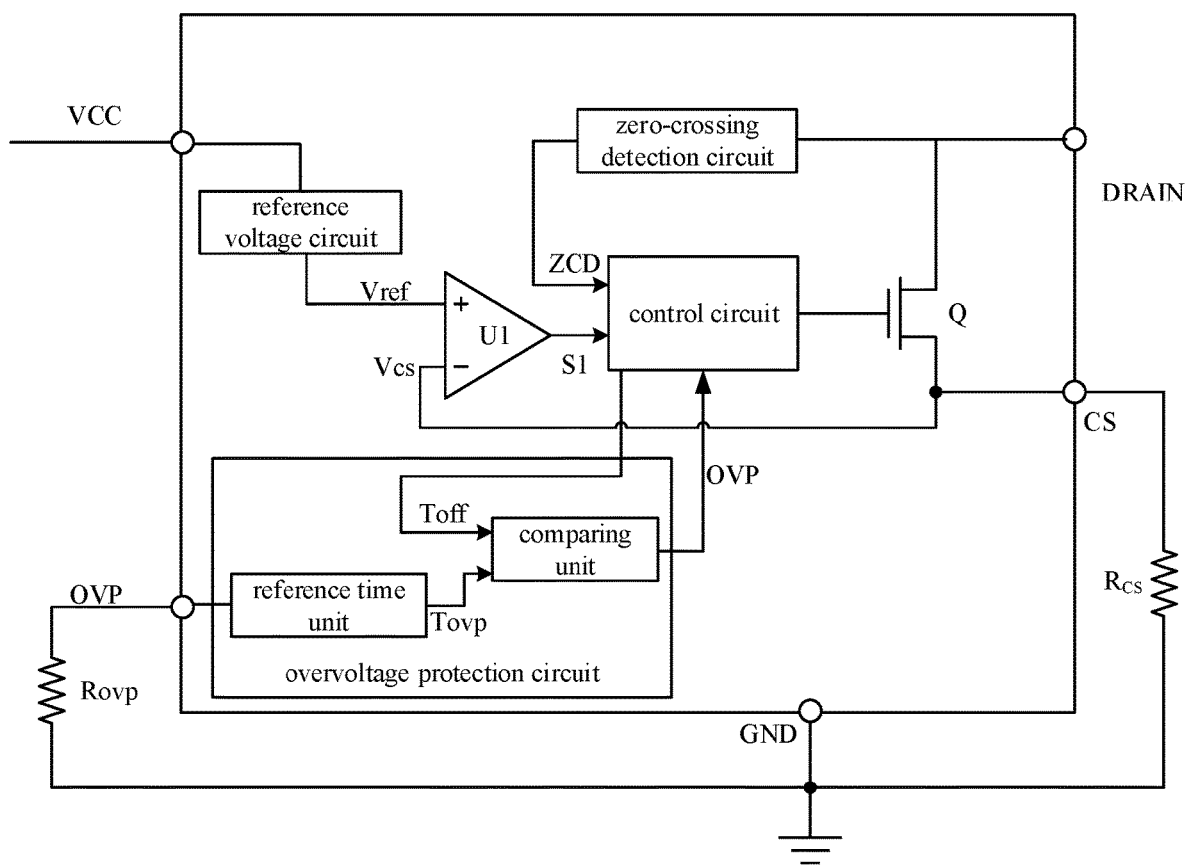
FIG. 2 is a block diagram showing an internal structure of the LED driving controller provided in FIG. 1.
Figure 3:
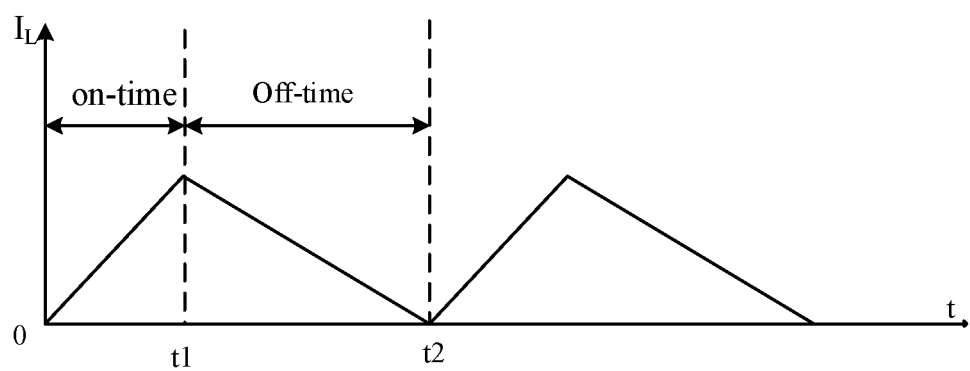
FIG. 3 is an operational waveform diagram of the LED driving controller 30 provided in FIG. 1.

Exemplary embodiments of the present disclosure will be described in more details below with reference to the accompanying drawings. In the drawings, like reference numerals denote like members. The figures are not drawn to scale, for the sake of clarity.

The specific contents of the present disclosure are further described in detail below with reference to the drawings and embodiments.

Figure 4:
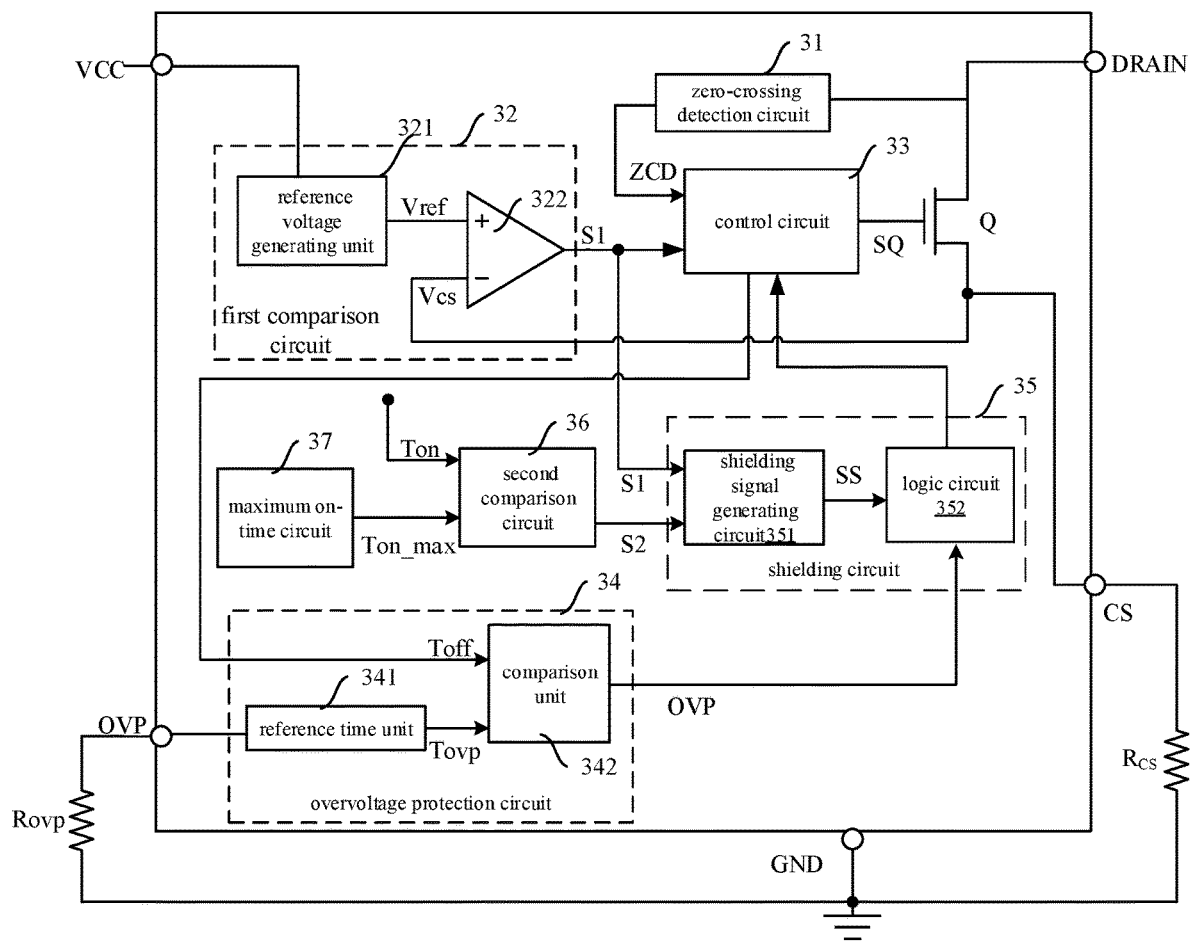
FIG. 4 is a block diagram showing an internal structure of an LED driving controller provided by a first embodiment of the present disclosure.

FIG. 4 is a block diagram showing an internal structure of an LED driving controller provided by a first embodiment of the present disclosure; As shown in FIG. 4, an LED driving controller 30 includes a power transistor Q, a zero-crossing detection circuit 31, a first comparison circuit 32, a control circuit 33, an overvoltage protection circuit 34, and a shielding circuit 35.

The power transistor Q has a control terminal, a first terminal and a second terminal, and the control terminal receives a switching control signal SQ, the first terminal is coupled to an LED load through an inductor L, and the second terminal is grounded through a sampling resistor Rcs.

In the present embodiment, the LED driving controller 30 includes a supply terminal Vcc for providing a supply voltage to the LED driving controller 30; a ground terminal GND for providing an internal ground for the LED chip; and a terminal DRAIN being coupled to the LED load through the inductor L; a sampling terminal CS being coupled the ground terminal GND through the sampling resistor Rcs and for sampling the inductor current IL of the inductor L, wherein the voltage drop across the sampling resistor Rcs is used as the sampling voltage Vcs; and an overvoltage protection terminal OVP being coupled to the ground port GND through an overvoltage protection resistor Rovp. The first terminal of the power transistor is coupled to the terminal DRAIN, and the second terminal is coupled to the sampling terminal CS.

The zero-crossing detection circuit 31 has an input terminal being coupled to the first terminal of the power transistor and generates a zero-crossing detection signal ZCD.

In this embodiment, the input terminal of the zero-crossing detection circuit 31 is coupled to the first terminal of the power transistor Q, that is, it is coupled to the terminal DRAIN of the LED driving controller 30, the zero-crossing detection circuit 31 detects the inductor current IL of the inductor L and generates the zero-crossing detection signal. When the inductor current IL is detected to be zero, the switching control signal SQ generated by the control circuit 33 and in accordance with the zero-crossing detection signal is a turn-on signal and the control circuit 33 controls the power transistor Q to be turned on in accordance with the switching control signal SQ.

The first comparison circuit 32 is configured to compare a reference voltage with the sampling voltage to generate the first control signal.

In this embodiment, the first comparison circuit 32 includes a reference voltage generating unit 321 and a first comparing unit 322, wherein the reference voltage generating unit 321 is configured to generate a reference voltage Vref in accordance with the supply voltage Vcc, a first input terminal of the first comparison circuit 322 receives the reference voltage Vref, a second input terminal of the first comparison circuit 322 receives the sampling voltage Vcs, and an output terminal of the first comparison circuit 322 outputs a first control signal S1. When the sampling voltage Vcs is greater than the reference voltage Vref, the switching control signal SQ generated by the control circuit 33 and in accordance with the first control signal S1 is a turn-off signal and the control circuit 33 controls the power transistor Q to be turned off in accordance with the switching control signal SQ.

The control circuit 33 is coupled to the zero-crossing detection circuit 31 and the first comparison circuit 32 and generates the switching control signal SQ in accordance with the zero-cross detection signal ZCD and the first control signal S1, wherein the switching control signal SQ is used to turn on and off the power transistor Q.

The overvoltage protection circuit 34 has an input terminal grounded through the overvoltage protection resistor Rovp and is configured to generate an overvoltage protection signal OVP in accordance with an off-time Toff provided by the control circuit 33 and a reference voltage Vovp.

In the present embodiment, the overvoltage protection circuit 34 includes a reference time unit 341 for generating a reference time Tovp in accordance with the reference voltage Vovp, and a second comparison unit 342 for generating the overvoltage protection signal OVP in accordance with the off-time Toff provided by the control circuit and the reference time Tovp. When Toff is smaller than Tovp, the control circuit 33 turns off the power transistor Q in accordance with the overvoltage protection signal OVP, and enters in the overvoltage protection mode.

The shielding circuit 35 is disposed between the overvoltage protection circuit 34 and the control circuit 33, and is configured to make the overvoltage protection signal OVP ineffective in accordance with a shielding signal SS when the power transistor Q is turned off and to be reset to make the overvoltage protection signal OVP effective when the power transistor Q is turned on.

Figure 5:
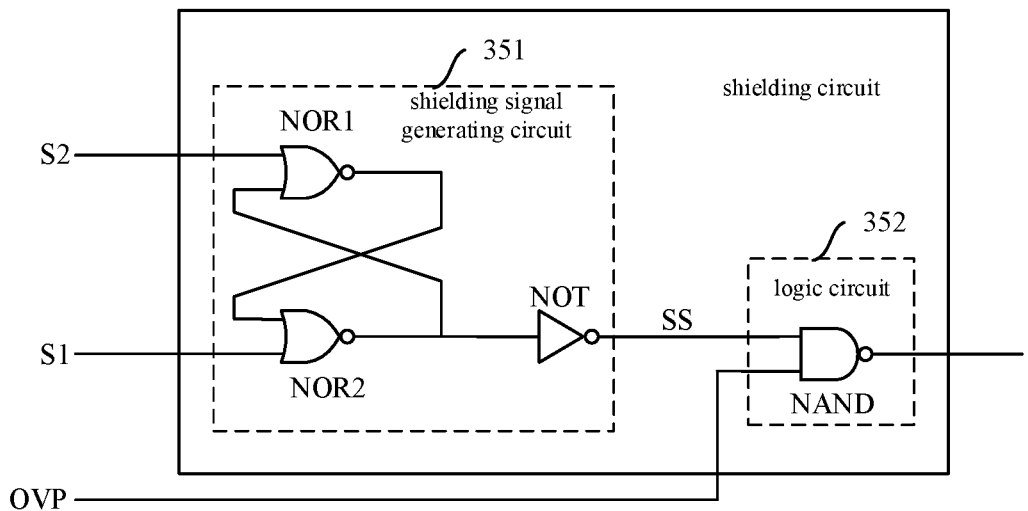
FIG. 5 is a circuit diagram of a shielding circuit of the LED driving controller provided by the first embodiment of the present disclosure.

The LED driving controller is as shown in FIG. 5. The shielding circuit 35 includes a shielding signal generating circuit 351 and a logic circuit 352, wherein the shielding signal generating circuit 351 is configured to generate the shielding signal SS in accordance with the first control signal S1 and a second control signal S2, the logic circuit 352 is configured to shield the overvoltage protection signal OVP from being effective in accordance with the shielding signal SS when the power transistor Q is turned off, and to be reset to make the overvoltage protection signal OVP effective when the power transistor Q is turned on.

In a preferred embodiment, the shielding signal generating circuit 351 includes two NOR gates NOR1 and NOR2 and a NOT gate NOT. A first input terminal of the NOR gate NOR1 receives the second control signal S2, a second input terminal of the NOR gate NOR1 is coupled to an output terminal of the NOR gate NOR2, and an output terminal of the NOR gate NOR1 is coupled to a first input terminal of the NOR gate NOR2, and a second input terminal of the NOR gate NOR2 receives the first control signal S1, and the output terminal of the NOR gate NOR2 outputs the shielding signal SS. The logic circuit 352 includes a NAND gate NAND, wherein a first input terminal of the NAND gate NAND receives the shielding signal SS, a second input terminal receives the overvoltage protection signal OVP, and an output terminal is coupled to the control circuit 33.

In a preferred embodiment, the LED driving maximum on-time circuit controller further includes a second comparison circuit 36 and a maximum on-time circuit 37. The second comparison circuit 36 is configured to generate the second control signal S2 in accordance with an on-time Ton and a maximum on-time Ton-max provided by the control circuit. The maximum on-time circuit 37 is configured to generate the maximum on-time Ton-max. When Ton>Ton-max, the second comparison circuit 36 outputs the second control signal S2.

Figure 6A:
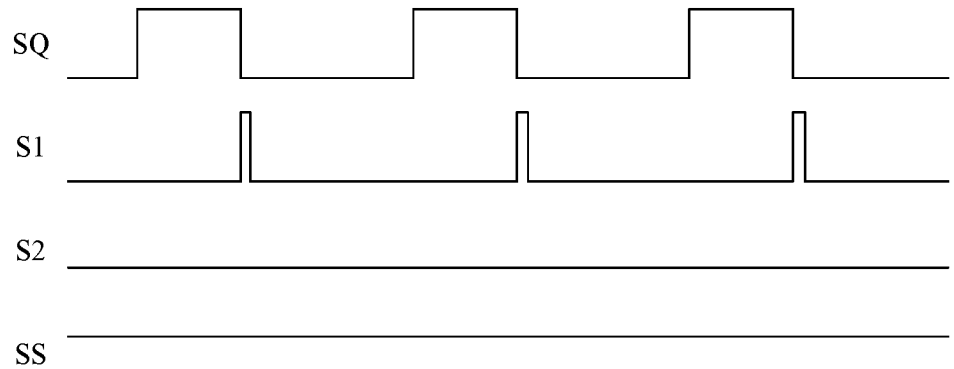
FIG. 6a and FIG. 6b respectively show signal waveform diagrams when an LED driving controller provided by a second embodiment of the present disclosure operates.
Figure 6B:
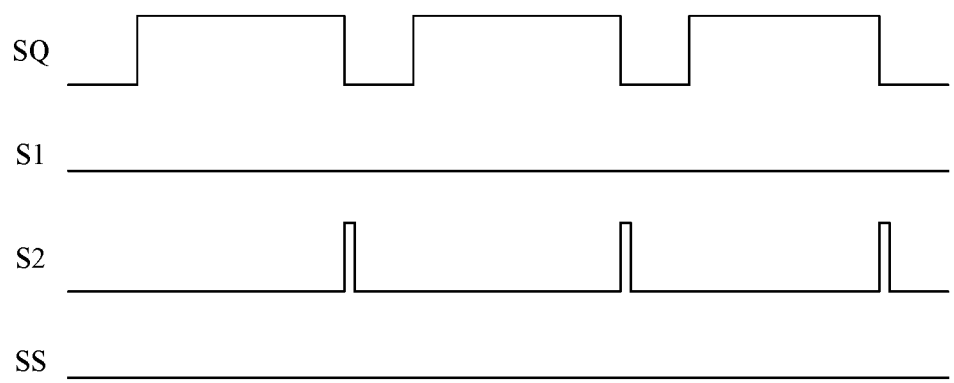

FIG. 6a and FIG. 6b show signal waveform diagrams when the LED driving controller provided by the first embodiment operates. As shown in FIG. 6a, when the first control signal S1 is a high level pulse and the second control signal S2 is kept at a low level, the shielding signal SS remains at a high level, so that the overvoltage protection signal OVP is effective. In this case, the LED load is in a light load state, and the inducting current is relatively large, the sampling voltage Vcs may be greater than the reference voltage Vref. Therefore, the first control signal S1 is a high level pulse, and the on-time of the power transistor is always smaller than the maximum on-time (i.e., Ton<Ton-max), so the second control signal S2 remains at a low level. At this time, the shielding signal SS is kept at a high level, and the overvoltage protection signal OVP is kept effective at all the time.

As shown in FIG. 6b, when the first control signal S1 is kept at a low level and the second control signal S2 is a high level pulse, the shielding signal SS is kept at a low level, so that the overvoltage protection signal OVP is ineffective. In this case, the LED load is in a heavy load state, the inducting current is relatively small, and the sampling voltage Vcs cannot be greater than the reference voltage Vref. Therefore, when the first control signal S1 is kept at a low level, it may occur that the time period during which the power transistor is on is greater than the maximum on-time, and thus the second control signal S2 is a high level pulse. At this time, the shielding signal SS is kept at a low level, and the overvoltage protection signal OVP is ineffective at all the time.

In the LED driving controller provided by the first embodiment, the shielding circuit is disposed between the overvoltage protection circuit and the control circuit, and the shielding circuit prevents the overvoltage protection circuit from being effective in accordance with the shielding signal in the time period during which the power transistor is off, so that the LED driving circuit is prevented from entering in the overvoltage protection mode when the input voltage is relatively small and the voltage of the LED load is relatively large to avoid LED flashing. Further, the shielding circuit is reset when the power transistor is turned on, so that the overvoltage protection circuit operates normally to avoid the phenomenon of LED burning.

Figure 7:
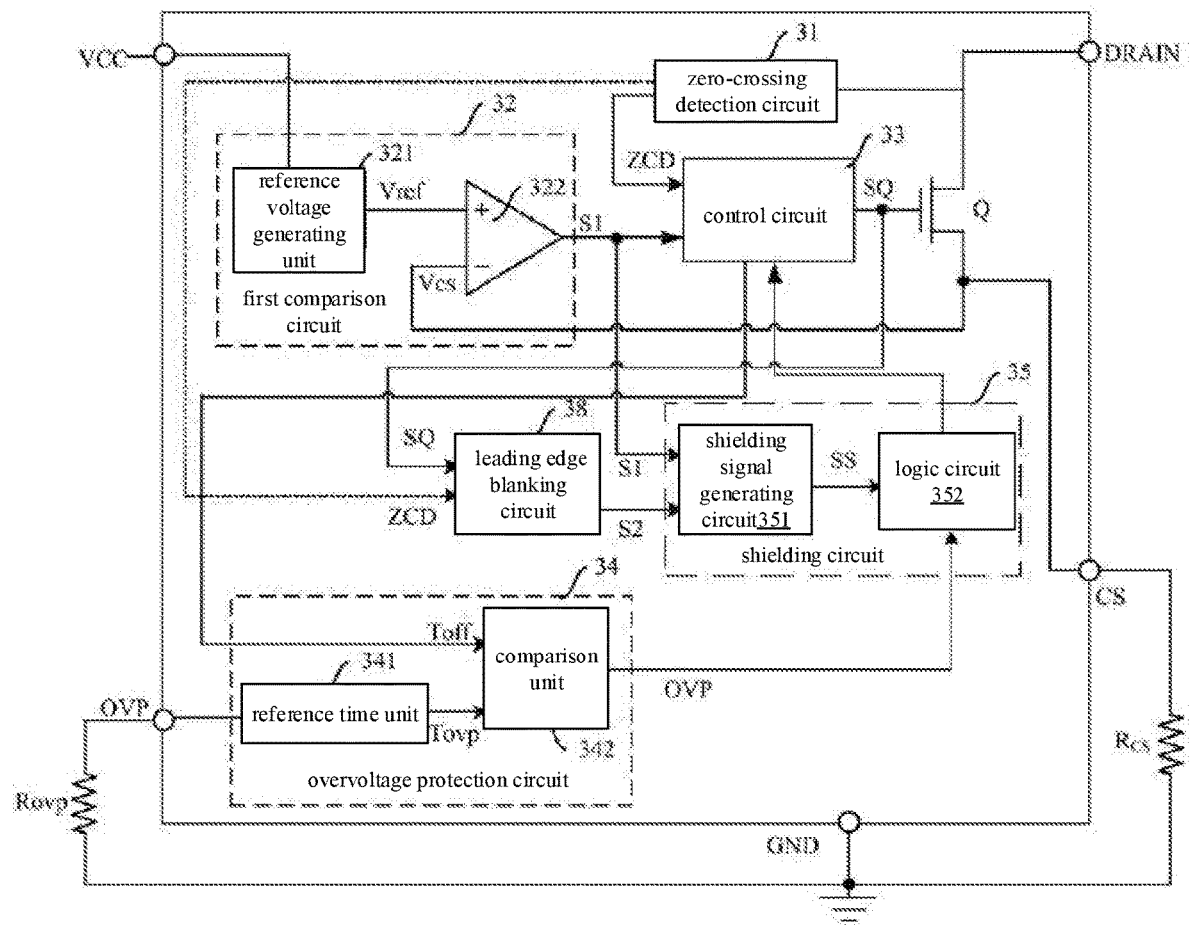
FIG. 7 is a block diagram showing an internal structure of the LED driving controller provided by the second embodiment of the present disclosure.

FIG. 7 is a block diagram showing an internal structure of the LED driving controller according to a second embodiment of the present disclosure. As shown in FIG. 7, the LED driving controller 30 includes a power transistor Q, a zero-crossing detection circuit 31, a first comparison circuit Vcc, a control circuit 33, an overvoltage protection circuit 34, and a shielding circuit 35.

The power transistor Q has a control terminal, a first terminal and a second terminal and the control terminal receives a switching control signal SQ, the first terminal is coupled to a LED load through an inductor L, and the second terminal is grounded through a sampling resistor Rcs.

In the present embodiment, the LED driving controller 30 includes a supply terminal Vcc for proving a supply voltage to the LED driving controller 30; a ground terminal GND for providing an internal ground for an LED chip; and a terminal DRAIN being coupled to the LED load through the inductor L; a sampling terminal CS being coupled the ground terminal GND through the sampling resistor Rcs and for sampling the inductor current IL of the inductor L, wherein the voltage drop across the sampling resistor Rcs is used as a sampling voltage Vcs; an overvoltage protection terminal OVP being coupled to the ground port GND through an overvoltage protection resistor Rovp. The first terminal of the power transistor is coupled to the terminal DRAIN, and the second terminal is coupled to the sampling terminal CS.

The zero-crossing detection circuit 31 has an input terminal being coupled to the first terminal of the power transistor and generates a zero-crossing detection signal ZCD.

In this embodiment, the input terminal of the zero-crossing detection circuit 31 is coupled to the first terminal of the power transistor Q, that is, it is coupled to the terminal DRAIN of the LED driving controller 30, the zero-crossing detection circuit 31 detects the inductor current IL of the inductor L, and generates the zero-crossing detection signal. When the inductor current IL is detected to be zero, the switching control signal SQ generated by the control circuit 33 and in accordance with the zero-crossing detection signal is a turn-on signal and the control circuit 33 controls the power transistor Q to be turned on in accordance with the switching control signal SQ.

The first comparison circuit 32 is configured to compare a reference voltage with the sampling voltage to generate the first control signal.

In this embodiment, the first comparison circuit 32 includes a reference voltage generating unit 321 and a first comparing unit 322, wherein the reference voltage generating unit 321 is configured to generate a reference voltage Vref in accordance with the supply voltage Vcc, a first input terminal of the first comparison circuit 32 receives the reference voltage Vref, a second input terminal of the first comparison circuit 32 receives the sampling voltage Vcs, and an output terminal of the first comparison circuit 32 outputs the first control signal S1. When the sampling voltage Vcs is greater than the reference voltage Vref, the switching control signal SQ generated by the control circuit 33 and in accordance with the first control signal S1 is a turn-off signal and the control circuit 33 controls the power transistor Q to be turned off in accordance with the switching control signal SQ.

The control circuit 33 is coupled to the zero-crossing detection circuit 31 and the first comparison circuit 32 and generates the switching control signal SQ in accordance with the zero-cross detection signal ZCD and the first control signal S1, wherein the switching control signal SQ is used to turn on and off the power transistor Q.

The overvoltage protection circuit 34 has an input terminal grounded through the overvoltage protection resistor Rovp for generating an overvoltage protection signal OVP in accordance with an off-time Toff provided by the control circuit 33 and a reference voltage Vovp.

In the present embodiment, the overvoltage protection circuit 34 includes a reference time unit 341 for generating a reference time Tovp in accordance with the reference voltage Vovp, and a second comparison unit 342 for generating the overvoltage protection signal OVP in accordance with the off-time Toff provided by the control circuit and the reference time Tovp. When Toff is smaller than Tovp, the control circuit 33 turns off the power transistor Q in accordance with the overvoltage protection signal OVP, and enters in the overvoltage protection mode.

The shielding circuit 35 is disposed between the overvoltage protection circuit 34 and the control circuit 33. It is configured to make the overvoltage protection signal OVP ineffective in accordance with a shielding signal SS when the power transistor Q is turned off and to be reset to make the overvoltage protection signal OVP effective when the power transistor Q is turned on.

Figure 8:
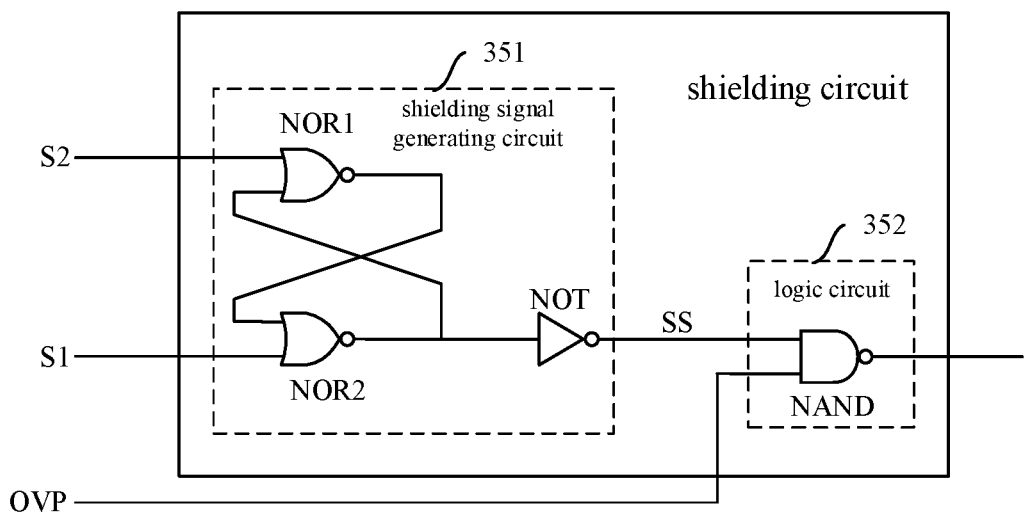
FIG. 8 is a circuit diagram showing a shielding circuit of the LED driving controller provided by the second embodiment of the present disclosure.

As shown in FIG. 8, the shielding circuit 35 includes a shielding signal generating circuit 351 and a logic circuit 352, wherein the shielding signal generating circuit 351 is configured to generate the shielding signal SS in accordance with the first control signal S1 and the second control signal S2, the logic circuit 352 is configured to shield the overvoltage protection signal OVP from being effective in accordance with the shielding signal SS when the power transistor Q is turned off, and to be reset to make the overvoltage protection signal OVP effective when the power transistor Q is turned on.

In a preferred embodiment, the shielding signal generating circuit 351 includes two NOR gates NOR1 and NOR2 and a NOT gate NOT. A first input terminal of the NOR gate NOR1 receives the second control signal S2, a second input terminal of the NOR gate NOR1 is coupled to an output terminal of the NOR gate NOR2, and an output terminal of the NOR gate NOR1 is coupled to a first input terminal of the NOR gate NOR2, and a second input terminal of the NOR gate NOR2 receives the first control signal S1, and the output terminal of the NOR gate NOR2 outputs the shielding signal SS. The logic circuit 352 includes a NAND gate NAND, wherein a first input terminal of the NAND gate NAND receives the shielding signal SS, a second input terminal receives the overvoltage protection signal OVP, and an output terminal is coupled to the control circuit 33.

In a preferred embodiment, the LED driving controller further include a leading edge blanking circuit 38 configured to generate the second control signal S2 in accordance with the switching control signal SQ. When the power transistor is turned on, the leading edge blanking circuit 38 will generate a high level pulse.

In a preferred embodiment, the leading edge blanking circuit 38 is further used to generate the second control signal S2 in accordance with the zero-crossing detection signal ZCD.

Figure 9A:
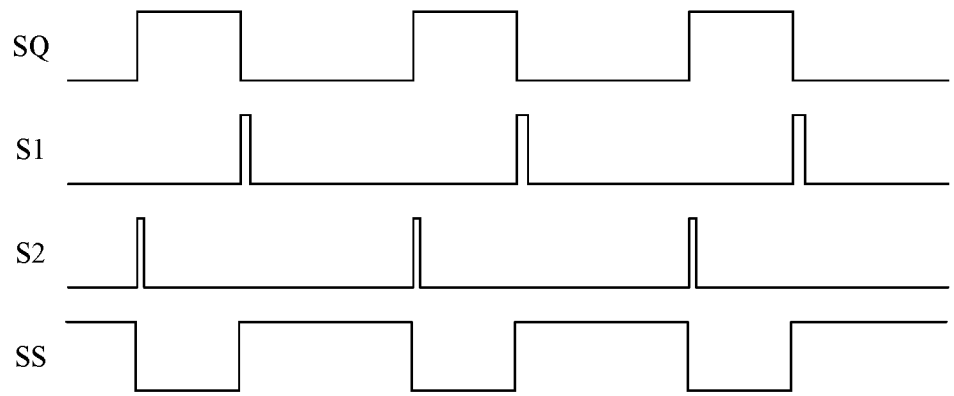
FIG. 9a and FIG. 9b respectively show signal waveform diagrams when the LED driving controller provided by the second embodiment of the present disclosure operates.
Figure 9B:
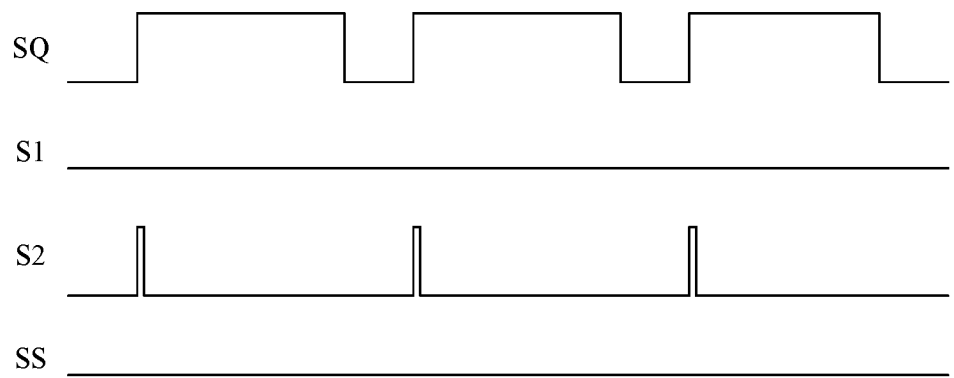

FIG. 9a and FIG. 9b respectively show signal waveform diagrams when the LED driving controller is active according to the second embodiment of the present disclosure.

As shown in FIG. 9a, when the first control signal and the second control signal are both high level pulses, the shielding signal is at a high level in the time period during which the power transistor is off, and at a low level in the time period during which the power transistor is on, so that the overvoltage protection signal is effective in the time period during which the power transistor is off and ineffective in the time period the power transistor is on. In this case, the LED load is in a light load state, and the inducting current is relatively large, the sampling voltage Vcs may be greater than the reference voltage Vref. Therefore, the first control signal S1 is a high level pulse for turning off the power transistor Q, and the second control signal S2 is a high level pulse generated at the turn-on instant of the power transistor Q, and the first control signal S1 is a high level pulse generated at the turn-off instant of the power transistor Q, and the second control signal S2 is a high level pulse generated at the turn-on instant of the power transistor Q. The shielding signal SS is at a high level in the time period during which the power transistor Q is off, and at a low level in the time period during which the power transistor Q is on, so that the overvoltage protection signal OVP is effective in the time period during which the power transistor is off and ineffective in the time period during the power transistor Q is on.

As shown in FIG. 9b, when the first control signal S1 is kept at a low level and the second control signal S2 is a high level pulse, the shielding signal SS is kept at a low level, so that the overvoltage protection signal OVP is ineffective. In this case, the LED load is in a heavy load state, the inducting current is relatively small, so that the sampling voltage Vcs cannot be greater than the reference voltage Vref. Therefore, when the first control signal S1 is kept at a low level, the second control signal S2 is a high level pulse generated at the turn-on instant of the power transistor Q. At this time, the shielding signal SS is kept at a low level, and the overvoltage protection signal OVP is ineffective at all the time.

In the LED driving controller provided by the second embodiment, the shielding circuit is disposed between the overvoltage protection circuit and the control circuit, and the shielding circuit prevents the overvoltage protection circuit from being effective in accordance with the shielding signal in the time period during which the power transistor is off, so that the LED driving circuit is prevented from entering in the overvoltage protection mode when the input voltage is relatively small and the voltage of the LED load is relatively large to avoid LED flashing. Further, the shielding circuit is reset when the power transistor is turned on, so that the overvoltage protection circuit operates normally to avoid the phenomenon of LED burning.

The disclosure also provides an LED driving circuit including the above LED driving controller.

The disclosure also provides an LED lighting device including the above LED driving circuit.

Although various embodiments of the present disclosure are described above, these embodiments neither present all details, nor imply that the present disclosure is limited to these embodiments. Obviously, many modifications and changes may be made in light of the teaching of the above embodiments. These embodiments are presented and some details are described herein only for explaining the principle of the disclosure and its actual use, so that one skilled person can practice the present disclosure and introduce some modifications in light of the disclosure. The disclosure is intended to cover alternatives, modifications and equivalents that may be included within the spirit and scope of the disclosure as defined by the appended claims.

The invention claimed is:
1. A LED driving controller, comprising:
a power transistor having a control terminal for receiving a switching control signal, a first terminal being coupled to an LED load through an inductor and a second terminal being grounded through a sampling resistor;

a zero-crossing detection circuit having an input terminal being coupled to said first terminal of said power transistor and configured to generate a zero-crossing detection signal;

a first comparison circuit, configured to compare a reference voltage with a sampling voltage to generate a first control signal;

a control circuit being coupled to said zero-crossing detection circuit and said first comparison circuit and configured to generate a switching control signal in accordance with said zero-crossing detection signal and said first control signal, wherein said switching control signal is used to turn on and off said power transistor;

an overvoltage protection circuit having an input terminal being grounded through an overvoltage protection resistor and configured to generate an overvoltage protection signal in accordance with an off-time provided by said control circuit and a reference voltage;

a shielding circuit being disposed between said overvoltage protection circuit and said control circuit and configured to shield said overvoltage protection signal from being effective in accordance with a shielding signal when said power transistor is turned off and to be reset to make said voltage protection signal to be effective when said power transistor is turned on.

2. The LED driving controller according to claim 1 wherein said shielding circuit comprises:

a shielding signal generating circuit configured to generate said shielding signal in accordance with said first control signal and a second control signal; and a logic circuit configured to shield said overvoltage protection signal from being effective in accordance with said shielding signal when said power transistor is turned off, and to be reset to make said overvoltage protection signal effective when said power transistor is turned on.

3. The LED driving controller according to claim 2, further comprising:

a second comparison circuit configured to generate said second control signal in accordance with an on-time and a maximum on-time provided by said control circuit.

4. The LED driving controller according to claim 3, wherein when said first control signal is a high level pulse and said second control signal is kept at a low level, said shielding signal remains at a high level to make said overvoltage protection signal effective.

5. The LED driving controller according to claim 4, further comprising:

a maximum on-time circuit configured to generate said maximum on-time.

6. The LED driving controller according to claim 3, wherein when said first control signal is kept at a low level and said second control signal is a high level pulse, said shielding signal is kept at a low level to make an overvoltage protection signal ineffective.

7. The LED driving controller according to claim 2, further comprising:

a leading edge blanking circuit configured to generate said second control signal in accordance with said switching control signal.

8. The LED driving controller according to claim 7, wherein when said first control signal and said second control signal are both high level pulses, said shielding signal is at a high level in the time period during which said power transistor is off, and at a low level in the time period during which said power transistor is on, so that said overvoltage protection signal is effective in the time period during which said power transistor is off and ineffective in the time period during said power transistor is on.

9. The LED driving controller according to claim 7, wherein when said first control signal is kept at a low level and said second control signal is a high level pulse, said shielding signal is kept at a low level to make said overvoltage protection signal ineffective.

10. The LED driving controller according to claim 2, wherein said shielding signal generating circuit comprises a first NOR gate, a second NOR gate, and a NOT gate, said first NOR gate has a first input terminal for receiving said second control signal, a second input terminal being coupled to an output terminal of said second NOR gate, and an output terminal being coupled to a first input terminal of said second NOR gate;

said first input terminal of said second NOR gate is coupled to said output terminal of said first NOR gate, a second input terminal of said second NOR gate f receives said first control signal and said output terminal of said second NOR gate outputs said shield signal.

11. The LED driving controller according to claim 2, wherein said logic circuit is a NAND gate.

12. The LED driving controller according to claim 1, wherein said first comparison circuit comprises:

a reference voltage generating unit configured to generate said reference voltage in accordance with a supply voltage;

a first comparison unit configured to generate said first control signal in accordance with said reference voltage and said sampling voltage.

13. The LED driving controller according to claim 1, wherein said overvoltage protection circuit comprises:

a reference time unit configured to generate a reference time in accordance with said reference voltage; and a second comparison unit configured to generate said overvoltage protection signal in accordance with said off-time provided by said control circuit and said reference time.

14. An LED driving circuit comprising a rectifier and filter circuit, an output stage circuit, and said LED driving controller in accordance with claim 1.

15. An LED lighting device comprising said LED driving circuit of claim 14 and an LED load.

* * * * *